(12) United States Patent
Fukazawa et al.

(10) Patent No.: US 6,833,975 B2
(45) Date of Patent: Dec. 21, 2004

(54) PERPENDICULAR MAGNETIC RECORDING MEDIUM AND APPARATUS INCLUDING A SOFT MAGNETIC LAYER, AN AT LEAST 20 NM THICK NON-MAGNETIC LAYER, AND A 50-90 NM GAP LENGTH

(75) Inventors: Toshio Fukazawa, Kyoto (JP); Masaya Sakaguchi, Osaka (JP); Akira Ahagon, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 21 days.

(21) Appl. No.: 10/212,239

(22) Filed: Aug. 6, 2002

(65) Prior Publication Data
US 2003/0031897 A1 Feb. 13, 2003

(30) Foreign Application Priority Data
Aug. 8, 2001 (JP) .................... P2001-240606

(51) Int. Cl.$^7$ .................... G11B 5/127; G11B 5/667
(52) U.S. Cl. .................... 360/97.01; 360/317; 360/135; 360/119; 428/611; 428/686; 428/332; 428/336; 428/694 TS
(58) Field of Search .................... 428/611, 686, 428/332, 336, 694 TS, 692; 360/110, 313, 324, 324.2, 119, 317, 97.01, 135

(56) References Cited

U.S. PATENT DOCUMENTS 4,687,712 A * 8/1987 Sugita et al. ............... 428/611
5,750,270 A * 5/1998 Tang et al. ............... 428/611
6,580,270 B1 * 6/2003 Coehoorn ............... 324/252
6,606,225 B1 * 8/2003 Funayama et al. ............ 360/321
2001/0013997 A1 * 8/2001 Sasaki et al. ............... 360/317

FOREIGN PATENT DOCUMENTS

JP 3-175497 7/1991
JP 3220116 8/2001

* cited by examiner

Primary Examiner—Kevin M. Bernatz
(74) Attorney, Agent, or Firm—McDermott Will & Emery LLP

(57) ABSTRACT

In accordance with the present invention, in a magnetic recording medium for perpendicular magnetic recording, a recording characteristic which is not inferior to that of double-layer medium and a resolution of reproduction which is not inferior to that of single layer medium are provided. On a non-magnetic substrate, a soft magnetic layer for increasing a perpendicular component of recording magnetic field in a perpendicular magnetic recording layer is formed. A non-magnetic layer for suppressing extension of signal magnetic field loop from recording magnetization in the perpendicular magnetic recording layer is formed on the soft magnetic layer. The perpendicular magnetic recording layer is formed on the non-magnetic layer. The non-magnetic layer has a thickness required to effectively reduce the signal magnetic field loop. The required thickness exceeds 20 nm.

12 Claims, 10 Drawing Sheets

PERPENDICULAR MAGNETIC RECORDING MEDIUM AND APPARATUS INCLUDING A SOFT MAGNETIC LAYER, AN AT LEAST 20 NM THICK NON-MAGNETIC LAYER, AND A 50-90 NM GAP LENGTH

BACKGROUND OF THE INVENTION

1. Field of the Invention

The present invention relates to a magnetic recording medium used for perpendicular magnetic recording and a magnetic recording and reproducing apparatus.

2. Description of the Related Art

Perpendicular magnetic recording which enables high recording density by longitudinal recording has attracted attention in the field of magnetic recording. A single layer medium 71 shown in FIG. 8A and a double-layer medium 74 shown in FIG. 8B are known as a magnetic recording medium used for perpendicular magnetic recording.

A single layer medium 71 is formed by laminating a perpendicular magnetic recording layer 73 on a non-magnetic substrate 72. A double-layer medium 74 is formed by laminating a soft magnetic layer 76 and a perpendicular magnetic recording layer 77 in that order on a non-magnetic substrate 75. A protective layer and a lubricant layer (both of them are not shown) are formed on the perpendicular magnetic recording layer in both of cases of the single layer medium and the double-layer medium.

A reproducing head 78 is a shielded type magnetoresistance effect element head. A pair of shielding layers 79a, 79b are provided so as to sandwich a non-magnetic layer 81 and a magnetoresistance effect element 80 is disposed at a part of the non-magnetic layer 81 between the shielding layers 79a and 79b.

A recording head is not shown. Nevertheless, as a magnetic field component (perpendicular component) in a thickness direction of the perpendicular magnetic recording layers 73 and 77 is required, a head having a main magnetic pole to obtain larger perpendicular component of recording magnetic field is used instead of a ring type recording head used in an longitudinal recording medium.

The single layer medium and the double-layer medium respectively have advantages and disadvantages for recording and reproducing.

The double-layer medium is superior to the single layer medium for recording in a magnetic recording medium for perpendicular magnetic recording. The reason is as follows. Namely, in accordance with the double-layer medium, as a result of soft magnetic layer taking in lines of magnetic force from a main magnetic pole in unillustrated recording head, the lines of magnetic force from the main magnetic pole act on the perpendicular magnetic recording layer with larger perpendicular component. That is to say, the soft magnetic layer amplifies the perpendicular component of recording magnetic field in the perpendicular magnetic recording layer.

Nevertheless, the single layer medium is superior to the double-layer medium for reproducing the magnetic recording medium for perpendicular magnetic recording. In accordance with the double-layer medium, because the soft magnetic layer is provided, a signal magnetic field loop from a recording magnetization of perpendicular magnetic recording layer is extended, so that a resolution of reproduction is decreased.

The signal magnetic field loop from recording magnetization of the perpendicular magnetic recording layer is large in a case of the double-layer medium with the soft magnetic layer and is small in a case of the single layer medium without the soft magnetic layer. This is because the soft magnetic layer extends the signal magnetic field loop. Extension of the signal magnetic field loop decreases a resolution of reproduction. In order to increase the resolution of reproduction, it is ideal to pick up only the signal magnetic field loop from the recording magnetization immediately below the magnetoresistance effect element 80.

In a case of the single layer medium 71, as shown in FIG. 9A, a signal magnetic field loop 92 from a recording magnetization 91 which is apart from an area immediately below the magnetoresistance effect element 80 is not so extended. This is because the soft magnetic layer is not provided. The signal magnetic field loop 92 enters the shielding layer 79a and circulates to the recording magnetization 91 without passing through the magnetoresistance effect element 80. That is to say, the magnetoresistance effect element 80 does not pick up the signal magnetic field loop from the recording magnetization 91 placed apart from an area immediately below the magnetoresistance effect element 80. The resolution of reproduction is high from this standpoint.

On the other hand, in a case of the double-layer medium 74, as shown in FIG. 9B, a signal magnetic field loop 94 from a recording magnetization 93 of perpendicular magnetic recording layer 77 is extended because of soft magnetic layer 76. The signal magnetic field loop circulates via the shielding layer 79a, the magnetoresistance effect element 80, the perpendicular magnetic recording layer 77 and the soft magnetic layer 76 to the recording magnetization 93. As a result of the signal magnetic field loop 94 being extended, the signal magnetic field loop 94 from the recording magnetization 93 at an area spaced apart from an area immediately below the magnetoresistance effect element 80 is picked up by the magnetoresistance effect element 80. This leads to a decrease in the resolution of reproduction.

FIG. 10 shows linear recording density dependency of reproduced output. With respect to a unit of linear recording density, i.e., "kFCI", "k" indicates $10^3$ and "FCI" indicates Flux Change per Inch. A reproduced output obtained when the linear recording density is 100 kFCI in the double-layer medium is standardized as "1". A characteristic curve of the double-layer medium has large rate of change and a characteristic curve of the single layer medium has small rate of change. Larger reproduced output is preferable but in order to improve the resolution of reproduction, it is preferable that not the reproduced output but a rate of change is smaller. An output halving recording density $D_{50}$ which is a representative example of linear recording density resolution indicates a linear recording density at 50% of peak value of reproduced output. The output halving recording density $D_{50}$ of the double-layer medium is 510 kFCI (which is a value corresponding to 0.5, i.e., a half of peak value 1). In contrast, the output halving recording density $D_{50}$ of the single layer medium is 630 kFCI (which is a value corresponding to 0.27, i.e., a half of peak value 0.54). The output halving recording density $D_{50}$ of the single layer medium is larger than that of the double-layer medium. A resolution of reproduction of the single layer medium is superior to that of the double-layer medium.

With respect to a bit of recording magnetization in the perpendicular magnetic recording layer, upward or downward unit recording magnetization is determined as one bit (the shortest bit). As the number of unit recording magnetizations continued in the same direction is increased, long bit length is provided. On the other hand, the number of unit recording magnetizations is decreased, short bit length is provided. Namely, the larger the linear recording density is, the shorter the bit length is.

An influence of magnetic saturation of the magnetoresistance effect element is small in a case of the single layer medium because the signal magnetic field loop is small. In a case of the double-layer medium, the influence is exhibited because the signal magnetic field loop is extended. Still, in a case of shorter bit length, signal magnetic field loops reaching the magnetoresistance effect element 80 are alternately orientated and offset each other, so that the influence is not exhibited. In a case of longer bit length, signal magnetic field loops reaching the magnetoresistance effect element 80 are oriented in the same direction, so that the magnetoresistance effect element is easily saturated. This is shown in FIG. 10. Namely, closer to longer bit length side, i.e., lower linear recording density side, the reproduced output becomes significantly larger in the double-layer medium. If saturation occurs, a reproduced signal is deteriorated. Magnetic saturation occurs at a yoke type reproducing head more remarkably than a shielded type reproducing head.

As described above, in accordance with the single layer medium, a resolution of reproduction is excellent because a soft magnetic layer is not provided but recording characteristic is inferior. On the other hand, in accordance with the double-layer medium, the recording characteristic is excellent because of the soft magnetic layer but the resolution of reproduction is decreased because of the soft magnetic layer provided to improve the recording characteristic. The soft magnetic layer improves the recording characteristic but at the same time causes a decrease in the resolution of reproduction.

FIG. 11 show a yoke type reproducing head. FIG. 11A shows a case of the single layer medium 71 and FIG. 11B shows a case of the double-layer medium 74. A reference numeral 61 denotes a reproducing head, a reference numeral 62 denotes a gap layer, a reference numeral 63 denotes a first yoke, a reference numeral 64 denotes a second yoke, a reference numeral 64a denotes a front yoke, a reference numeral 64b denotes a back yoke and a reference numeral 65 denotes a magnetoresistance effect element.

In a case of the single layer medium 71, as shown in FIG. 11A, a signal magnetic field loop 92 generated from a recording magnetization 91 enters the first yoke 63 and does not reach the gap layer 62. Thus, the signal magnetic field loop does not enter the magnetoresistance effect element 65.

In a case of the double-layer medium 74, however, as shown in FIG. 11B, as the soft magnetic layer 76 is formed, a magnetic resistance is decreased. A signal magnetic field loop 94 generated from a recording magnetization 93 extends via the gap layer 62 to the first yoke 63 and the front yoke 64a. A part of the signal magnetic field loop circulates within a magnetic circuit of the reproducing head 61, enters the magnetoresistance effect element 65 and is reproduced. That is to say, as a signal of the recording magnetization 93 which is not placed immediately below the gap layer 62 is reproduced, a resolution of reproduction is decreased. Further, at a time of reproducing a signal with longer bit length, totally large signal magnetic field loop enters the reproducing head 61, so that the magnetoresistance effect element 65 is saturated. As a result, a signal cannot be properly reproduced.

SUMMARY OF THE INVENTION

Accordingly, a major object of the present invention is to solve the above-described drawbacks and to provide a magnetic recording medium and a magnetic recording and reproducing apparatus that sufficient recording magnetic field can be obtained at a time of recording and excellent resolution can be obtained at a time of reproduction.

Other objects, characteristics and advantages of the present invention will be apparent from the following description.

In order to accomplish the aforementioned object, the present invention provides the following sections in a magnetic recording medium for perpendicular magnetic recording. A soft magnetic layer is formed on a non-magnetic substrate. The soft magnetic layer is used to increase a perpendicular component of recording magnetic field in a perpendicular magnetic recording layer to be described later. A non-magnetic layer is formed on the soft magnetic layer. Then, a perpendicular magnetic recording layer is formed on the non-magnetic layer. The non-magnetic layer interposed between the soft magnetic layer and the perpendicular magnetic recording layer acts so as to suppress extension of signal magnetic field loop from recording magnetization in the perpendicular magnetic recording layer. That is to say, the non-magnetic layer is used to reduce the signal magnetic field loop from the recording magnetization. The non-magnetic layer has a thickness required to effectively reduce the signal magnetic field loop. The required thickness desirably exceeds 20 nm. The thickness of the non-magnetic layer is preferably larger in view of reducing the signal magnetic field loop generated from the recording magnetization in the perpendicular magnetic recording layer. An actual upper limit of the thickness is determined in order to control a total thickness of magnetic recording medium.

In summary, a magnetic recording medium of the present invention comprises a non-magnetic substrate, a soft magnetic layer formed on the substrate, a non-magnetic layer formed on the soft magnetic layer, and a perpendicular magnetic recording layer formed on the non-magnetic layer. The non-magnetic layer has a thickness required to reduce a signal magnetic field loop of recording magnetization of the perpendicular magnetic recording layer.

An operation of such structure is as follows. Namely, at a time of recording, sufficiently large perpendicular component of the recording magnetic field can be obtained because of the soft magnetic layer. At a time of reproduction, a magnetic resistance between the perpendicular magnetic recording layer and the soft magnetic layer is increased by the non-magnetic layer interposed between the perpendicular magnetic recording layer and the soft magnetic layer. Thus, extension of signal magnetic field loop generated from the recording magnetization in the perpendicular magnetic recording layer can be suppressed and a resolution at a time of reproduction can be improved. Further, because of the same reason, saturation of magnetoresistance effect element of reproducing head can be suppressed and thus superior reproduction characteristic can be obtained.

A method has been conventionally known in which in a double-layer medium, an intermediate layer (background layer) for improving orientation is formed on a soft magnetic layer to improve an orientation characteristic of the perpendicular magnetic recording layer, and the perpendicular magnetic recording layer is fromed on the intermediate layer. Although the intermediate layer for orientation improvement is non-magnetic, it merely acts so as to improve the orientation characteristic of the perpendicular magnetic recording layer. Namely, the intermediate layer is not used to suppress extension of signal magnetic field loop by increasing a magnetic resistance at a time of reproducing a recording magnetization subjected to perpendicular magnetic recording. The intermediate layer for orientation improvement has a thickness of a few nm or more to 20 nm or less and is desirably thin. This is not based on an idea that a loop of line of magnetic force is reduced.

In accordance with the present invention, a thickness of the non-magnetic layer between the soft magnetic layer and the perpendicular magnetic recording layer preferably exceeds 20 nm. Because of this thickness, it is possible to effectively suppress extension of signal magnetic field loop due to the soft magnetic layer. By setting such thickness, a resolution at a time of reproduction can be effectively improved.

In order to accomplish the aforementioned object, a magnetic recording and reproducing apparatus of the present invention is configured so as to record/reproduce a magnetic recording medium with a non-magnetic layer for increasing the above-described magnetic resistance being interposed between a perpendicular magnetic recording layer and a soft magnetic layer. Namely, the magnetic recording medium comprises at least a soft magnetic layer and a perpendicular magnetic recording layer on a non-magnetic substrate. Further, a non-magnetic layer is interposed between the soft magnetic layer and the perpendicular magnetic recording layer in order to increase the magnetic resistance between the perpendicular magnetic recording layer and the soft magnetic layer. The non-magnetic layer has a thickness required to reduce a signal magnetic field loop from recording magnetization of the perpendicular magnetic recording layer. The required thickness desirably exceeds 20 nm. The magnetic recording and reproducing apparatus of the present invention is configured so as to record/reproduce such magnetic recording medium.

In accordance with the magnetic recording and reproducing apparatus, because of the same reason as above described one, sufficient perpendicular component of recording magnetic field can be obtained and excellent recording characteristic can be exhibited. Further, a resolution at a time of reproduction can be made excellent, which has conventionally been considered to be difficult.

In accordance with a preferred aspect of the above magnetic recording and reproducing apparatus, a reproducing head for reproducing a magnetic recording medium with non-magnetic layer for increasing a magnetic resistance is configured as a shielded type reproducing head which has a magnetoresistance effect element which is sandwiched by shielding layers with a non-magnetic layer (which is different from the non-magnetic layer of the magnetic recording medium) being interposed therebetween. At a time of reproduction, an effect of suppressing extension of the signal magnetic field loop by the shields is exhibited and a resolution at a time of reproduction is advantageously improved.

In accordance with another preferred aspect, the reproducing head for reproducing a magnetic recording medium with non-magnetic layer for increasing a magnetic resistance is configured as a yoke type reproducing head that a magnetoresistance effect element is disposed at a part of magnetic circuit including a gap layer. In accordance with such aspect, at a time of reproduction, it is possible to prevent a signal magnetic field loop from recording magnetization of area spaced apart from an area immediately below a magnetoresistance effect element from crossing the gap layer, as well as a resolution can be improved, saturation of the magnetoresistance effect element can be suppressed and thus superior reproduction characteristic can be obtained.

A magnetic recording and reproducing apparatus in which the above-described magnetic recording medium is built may be used. Alternatively, a magnetic recording and reproducing apparatus with such magnetic recording medium being removable may be used.

A giant magnetoresistance effect element or a tunnel type magnetoresistance effect element is preferable as the magnetoresistance effect element. The giant magnetoresistance effect element is formed by laminating, at least, a magnetization fixing layer, a conductor layer and a magnetization free layer. The tunnel type magnetoresistance effect element is formed by laminating, at least, a magnetization fixing layer, an insulating layer and a magnetization free layer. In both cases, a rate of change of magnetic resistance relative to displacement of angle of rotation of magnetization is sufficiently high.

BRIEF DESCRIPTION OF THE DRAWINGS

These and other objects as well as advantages of the invention will become clear by the following description of preferred embodiments of the invention with reference to the accompanying drawings, wherein.

In all these figures, like components are indicated by the same numerals.

DETAILED DESCRIPTION OF THE PREFERRED EMBODIMENTS

Hereinafter, preferred embodiments of the present invention will be described with reference to the drawings.
(First Embodiment)

A description will be given of a magnetic recording medium for perpendicular magnetic recording relating to a first embodiment of the present invention with reference to FIGS. 1 through 6.

Firstly, recording will be described.

Figure 1:
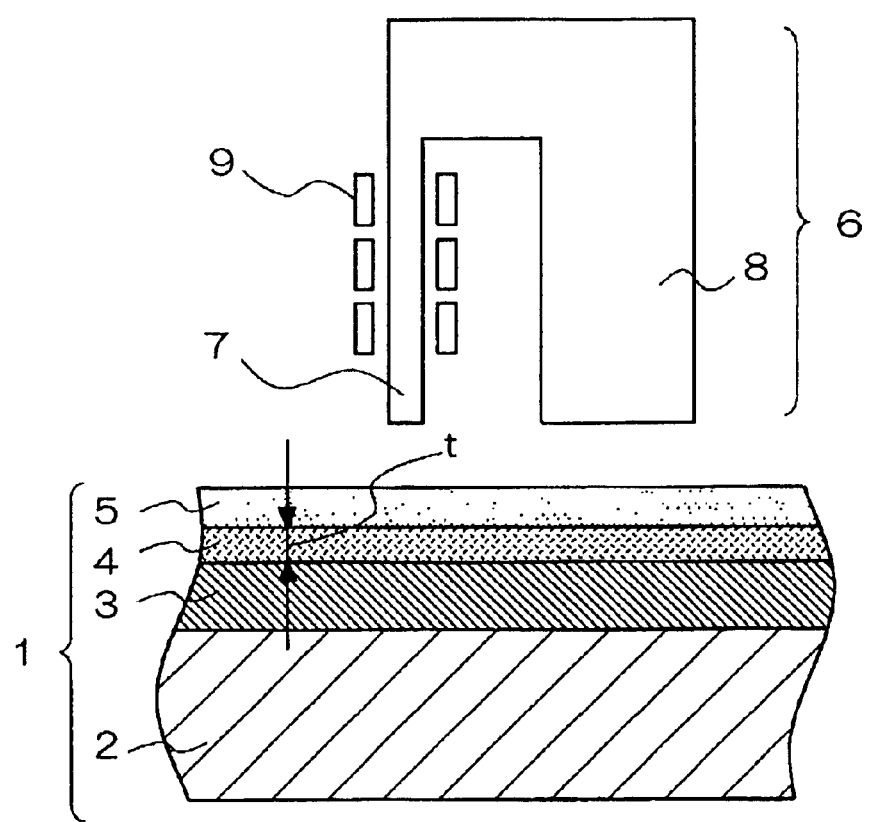
FIG. 1 is a cross-sectional view showing a schematic structure of a recording head of magnetic recording and reproducing apparatus and a magnetic recording medium in accordance with a first embodiment of the present invention.

As shown in FIG. 1, in accordance with a magnetic recording medium 1 for perpendicular magnetic recording, on a non-magnetic substrate 2, a soft magnetic layer 3, a non-magnetic layer 4 and a perpendicular magnetic recording layer 5 are successively formed in that order. A protective layer (not shown) and a lubricant layer (not shown) are formed on the perpendicular magnetic recording layer 5.

A recording head 6 forms a magnetic path formed of a main magnetic pole 7 and a return path 8. An exciting coil 9 is wound around the main magnetic pole 7.

At a time of recording operation, a recording current is applied to the coil 9. A recording magnetic field which is excited by the recording current flows through a magnetic circuit formed of the main magnetic pole 7, the perpendicular magnetic recording layer 5, the soft magnetic layer 3 and the return path 8. At this time, the soft magnetic layer 3 operates so as to perpendicularly take in the recording magnetic filed generated at the main magnetic pole 7. Thus, the recording magnetic field perpendicularly passes across the perpendicular magnetic recording layer 5. Namely, as the soft magnetic layer 3 is disposed at the side of the perpendicular recording layer 5 opposite the side at which the main magnetic pole 7 is disposed, the recording magnetic field having a large perpendicular component is applied to the perpendicular magnetic recording layer 5. Consequently, recording magnetization is securely formed at the perpendicular magnetic recording layer 5.

Figure 2:
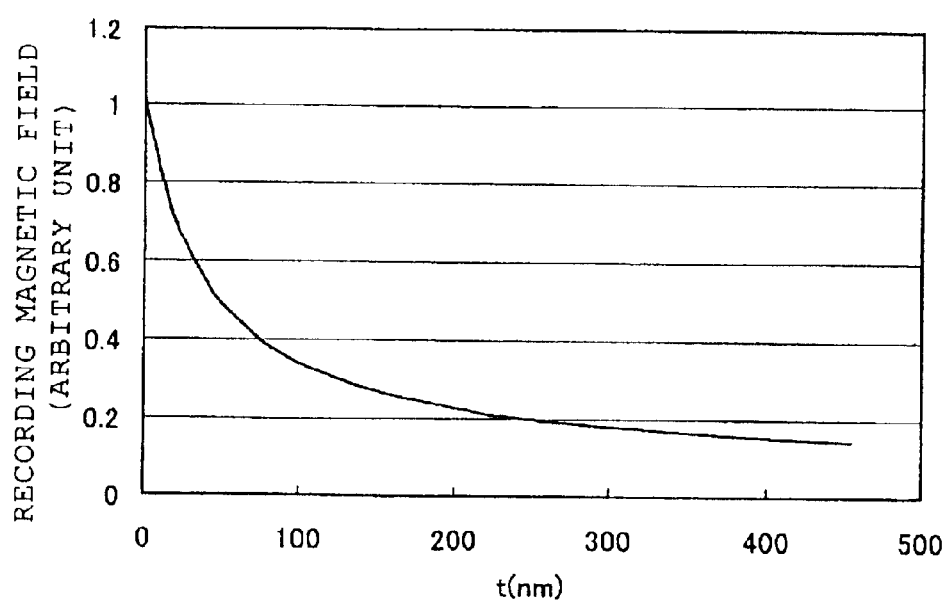
FIG. 2 is a characteristic view that a magnitude of perpendicular component of recording magnetic field relative to a perpendicular magnetic recording layer of the magnetic recording medium relating to the first embodiment of the present invention is plotted.

FIG. 2 shows results of calculation of perpendicular component of the recording magnetic field (Hy; a unit is relative) with a thickness t of the non-magnetic layer 4 formed between the soft magnetic layer 3 and the perpendicular magnetic recording layer 5 being a parameter. An intensity of recording magnetic field is a value measured at a thickness direction central portion of the perpendicular magnetic recording layer 5. A value obtained when the soft magnetic layer 3 is not provided is standardized as "1". A magnetic spacing serving as a distance from a top surface of the perpendicular magnetic recording layer 5 to a bottom surface of the recording head 6 is determined as 20 nm, and a thickness of the perpendicular magnetic recording layer 5 is determined as 25 nm.

Referring to FIG. 2, when the non-magnetic layer 4 is not formed between the soft magnetic layer 3 and the perpendicular magnetic recording layer 5, i.e., t=0 nm, a recording magnetic field which is about seven times larger than that of single layer medium can be obtained. When the non-magnetic layer 4 is provided, as a thickness t of the non-magnetic layer 4 increases, a perpendicular component of the recording magnetic field tends to decrease. Even if the thickness t is around 50 nm, a recording magnetic field which is more than three times larger than that of single layer medium can be obtained.

Next, reproduction will be described.

Figure 3:
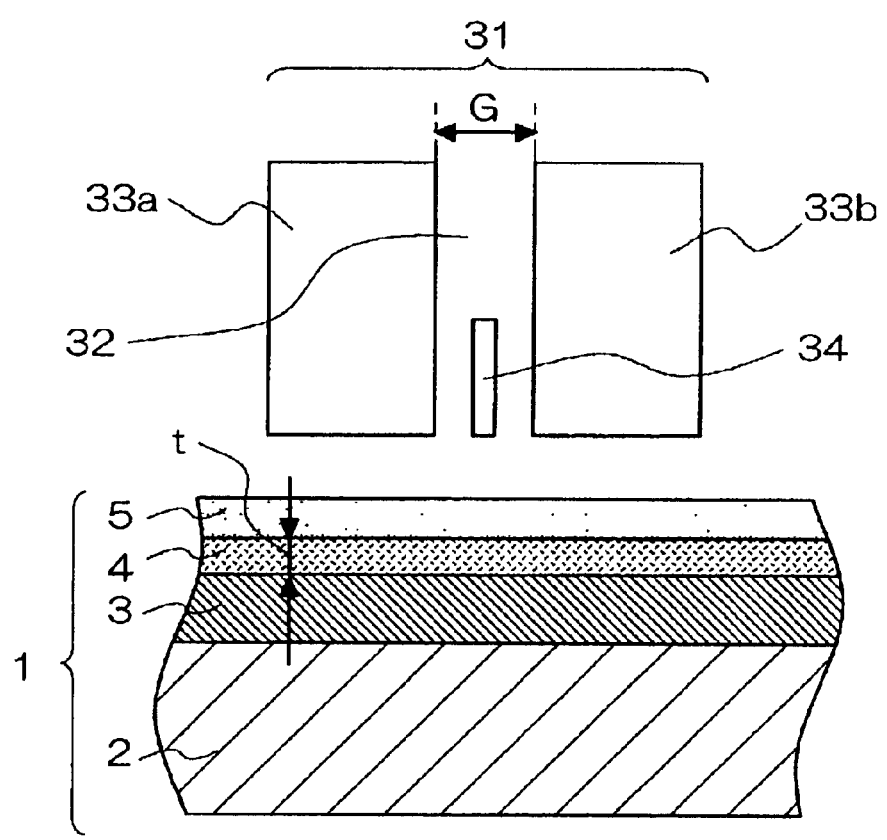
FIG. 3 is a cross-sectional view showing a schematic structure of (shielded type) reproducing head of the magnetic recording and reproducing apparatus and the magnetic recording medium relating to the first embodiment of the present invention.

Referring to FIG. 3, a structure of the magnetic recording medium 1 is the same as that of FIG. 1. In accordance with a reproducing head 31, a gap layer 32 is sandwiched by a pair of shielding layers 33a and 33b. A magnetoresistance effect element 34 is disposed in the gap layer 32.

The magnetoresistance effect element 34 is formed as a giant magnetoresistance effect element formed by laminating an antiferromagnetic layer, a magnetization fixing layer, a conductor layer and a magnetization free layer in that order. Magnetization of the magnetization fixing layer is fixed by an interaction between the antiferromagnetic layer and the magnetization fixing layer. When a magnetic field is applied from outside to the magnetoresistance effect element 34, only the magnetization of the magnetization free layer is rotated. Thus, an angle formed by the magnetization of the magnetization free layer relative to magnetization of the magnetization fixing layer is varied and an electric resistance value is varied on a basis of this variation. This is so-called spin valve type magnetoresistance effect element.

At a time of reproduction, a sense current is applied to the magnetoresistance effect element 34. When a signal magnetic field loop from the magnetic recording medium 1 acts on the magnetoresistance effect element 34, an electric resistance value of the magnetoresistance effect element 34 varies depending on an intensity of the signal magnetic field loop and a variation of the resistance value is read by the sense current.

Figure 4:
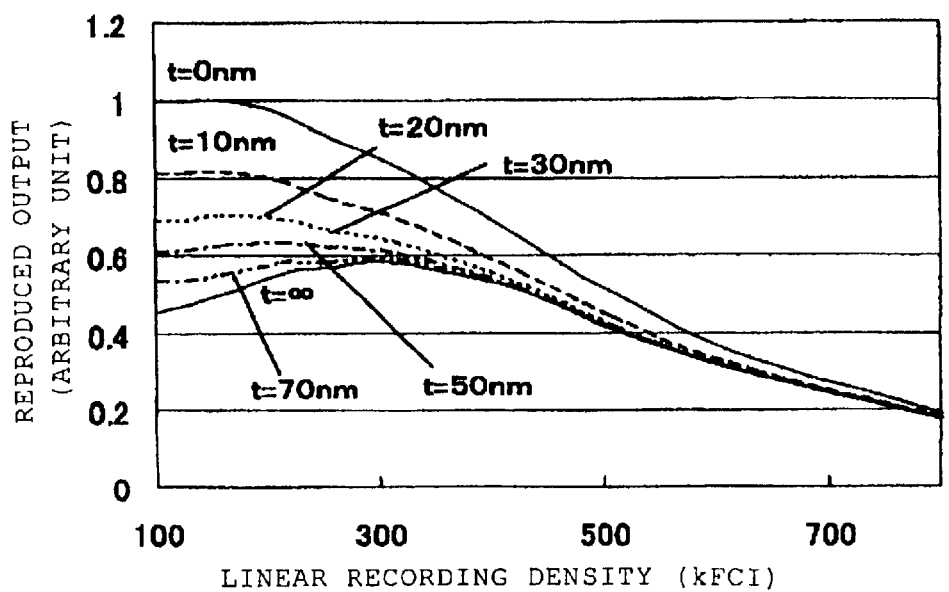
FIG. 4 is a characteristic view showing dependency of reproduced output on linear recording density with a thickness of non-magnetic layer being a parameter, in accordance with the first embodiment of the present invention.
Figure 5:
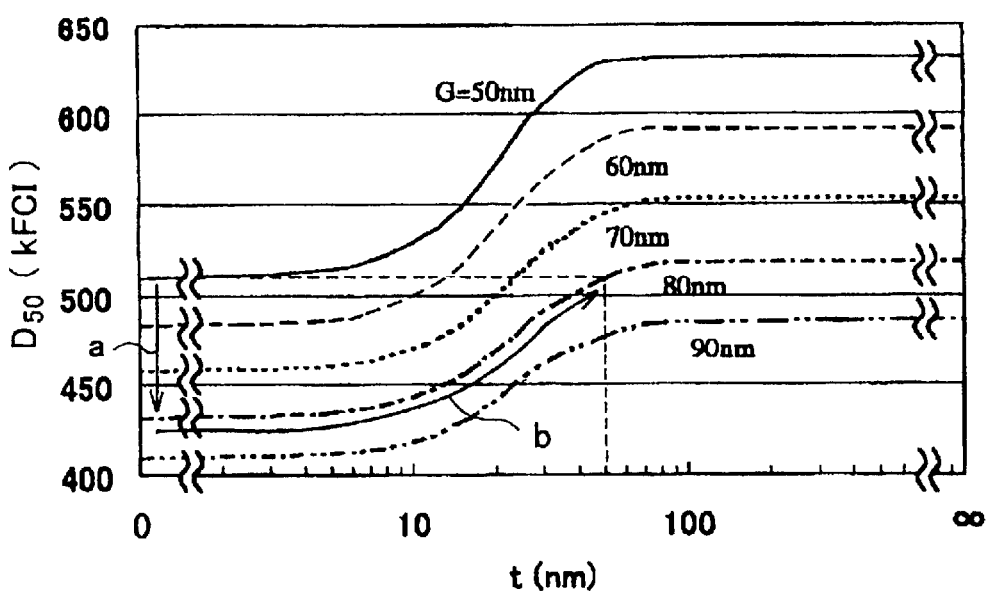
FIG. 5 is a characteristic view showing dependency of output halving recording density $D_{50}$ on a thickness of the non-magnetic layer with a gap length being a parameter, in accordance with the first embodiment of the present invention.

FIGS. 4 and 5 shows results of calculating dependency of linear recording density of reproduced output at a time of reproducing the signal magnetic field loop by using reciprocity theorem with a thickness t of the non-magnetic layer 4 being a parameter.

In accordance with the reciprocity theorem, in a linear circuit network that a voltage is combined with a current by a linear expression, assume that a current $I_{21}$ is applied to an output side when an electromotive force $V_{11}$ is applied to an input side. Further, assume that a current $I_{12}$ is applied to the input side when an electromotive force $V_{22}$ is applied to the output side. At this time, $V_{11}/I_{21}=V_{22}/I_{12}$, i.e., $V_{11} \times I_{12}=V_{21} \times I_{22}$ is provided.

Calculation is performed by using a calculation method disclosed in the following reference. The reference is "Simplified Expression of Shielded MR Head Response for Double-Layer Perpendicular Medium" (H. Muraoka, Y. Sugita and Y. Nakamura RIEC, Tohoku Univ., Sendai 980-8577 Japan IEEE TRANSACTIONS ON MAGNETICS, VOL. 35, NO. 5, SEPTEMBER 1999).

FIG. 4 shows dependency of reproduced output on a linear recording density with a thickness t of the nonmagnetic layer 4 being a parameter. An abscissa axis indicates a linear recording density (kFCI) and a vertical axis indicates a reproduced output (relative value). In the vertical axis, a reproduced output obtained when a linear recording density is 100 kFCI in a double-layer medium with t=0 nm is standardized as "1".

FIG. 5 shows dependency of output halving recording density $D_{50}$ (kFCI) on a thickness t (nm) of the non-magnetic layer 4 with a gap length G (nm) which is a distance between the shields shown in FIG. 3 being a parameter.

Referring to FIGS. 4 and 5, as described above, when t=0 nm, a recording medium corresponds to a double-layer medium without the non-magnetic layer and when t=∞, a recording medium corresponds to a single layer medium.

As shown in FIG. 5 as a thickness t of the non-magnetic layer 4 increases, a rate of change of the reproduced output decreases and the output halving recording medium $D_{50}$ increases.

Figure 6:
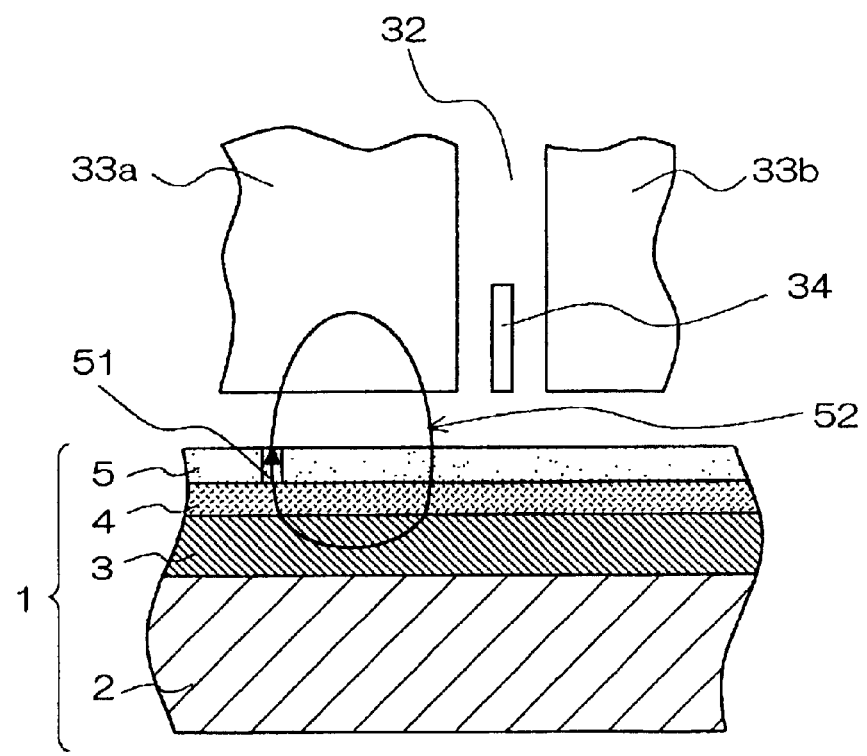
FIG. 6 is an explanatory view showing an operation of suppressing extension of signal magnetic field loop of recording magnetization by the non-magnetic layer, in accordance with the first embodiment of the present invention.

As shown in FIG. 6, a signal magnetic field loop 52 generated from a recording magnetization 51 in perpendicular magnetic recording layer 5 at an area spaced apart from an area immediately below the magnetiresistance effect element 34 flows in a shielding layer 33a but does not reach the magnetoresistance effect element 34. This is because the non-magnetic layer 4 is interposed between the perpendicular magnetic recording layer 5 and the soft magnetic layer 3 and thus a magnetic resistance between the perpendicular magnetic recording layer 5 and the soft magnetic layer 3 increases, resulting in suppression of extension of the signal magnetic field loop 52. The signal magnetic field loop 52 does not enter the magnetoresistance effect element 34 but circulates via the perpendicular magnetic recording layer 5, the non-magnetic layer 4 and the soft magnetic layer 3 to the recording magnetization 51 of the perpendicular magnetic recording layer 5. Thus, the output halving recording density $D_{50}$ can be increased and a resolution of reproduction is improved.

Next, the relationship of the gap length G serving as a distance between a pair of shielding layers 33a and 33b, the output halving recording density $D_{50}$ and a thickness t of the non-magnetic layer 4 will be described.

When the shielding layers 33a, 33b are made of metallic magnetic layer such as Ni—Fe, it is necessary to prevent a sense current of the magnetoresistance effect element 34 from shunting to the shielding layers. This is because a decrease in sense current due to shunt and a decrease of output must be prevented. Therefore, a gap layer 32 made of insulating material is interposed between the shielding layers 33a, 33b and the magnetoresistance effect element 34 such that insulation of the magnetoresistance effect element 34 is ensured. In order to ensure insulation, it is advantageous to make the gap length G larger. Nevertheless, if the gap length G becomes larger, the output halving recording density $D_{50}$ is decreased. This is generally known as gap loss.

Namely, a trade off is provided in which although it is preferable to increase the gap length G to suppress shunt of sense current, if the gap length G is increased, the output halving recording density $D_{50}$ is decreased and a resolution of reproduction is deteriorated.

Under such circumstances, it is advantageous to interpose the non-magnetic layer 4. A decrease in the output halving recording density $D_{50}$ caused by an increase in the gap length G is suppressed by the non-magnetic layer 4 being interposed.

A specific description will be given with reference to FIG. 5. An influence of an increase of the gap length G when a thickness t of the non-magnetic layer 4 is 0 nm, i.e., when the non-magnetic layer is not provided will be studied. It is found that as the gap length G increases, the output halving recording density $D_{50}$ decreases (see an arrow a). When the gap length G=50 nm, the output halving recording density $D_{50}$ is 510 kFCI. When the gap length G=80 nm, the output halving recording density $D_{50}$ is 430 kFCI.

Because the non-magnetic layer 4 is interposed, a decrease in the output halving recording density $D_{50}$ is suppressed. Interposing of the non-magnetic layer 4 means that a thickness t increases. As the thickness t increases, the output halving recording density $D_{50}$ tends to increase. When a thickness t=50 nm, the output halving recording density $D_{50}$=510 kFCI in a case of the gap length G=80 nm. This is the same as the output halving recording density $D_{50}$=510 kFCI when the gap length G=50 nm and the non-magnetic layer 4 is not formed. Namely, a decrease in the output halving recording density $D_{50}$ shown by the arrow a is corrected as shown by an arrow b by the non-magnetic layer 4 being interposed. When the non-magnetic layer 4 having a thickness of 50 nm is interposed, as described in FIG. 2, a recording magnetic field which is more than three times larger than that of single layer medium can be obtained. By ensuring a larger gap length, shut of sense current can be prevented, a yield of reproducing head can be improved and a cost can be reduced.

As described above, the non-magnetic layer 4 is provided and a thickness t is made larger than a predetermined value. As a result, the output halving recording density $D_{50}$ can be made larger and a resolution of reproduced signal can be improved. Characteristics of the reproduced output can approximate characteristics of single layer medium.

Characteristics corresponding to the double-layer medium can be obtained as recording characteristics. At a time of reproduction, characteristics corresponding to the single layer medium can be obtained. That is to say, an increase in the recording characteristic and an increase in the reproduction characteristic that are considered to be disagree with each other can accomplish at the same time.

(Second Embodiment)

Next, a magnetic recording medium for perpendicular magnetic recording relating to a second embodiment of the present invention will be described with reference to FIG. 7. FIG. 7 shows a magnetic recording medium and a reproducing head for magnetic recording and reproducing apparatus relating to the second embodiment. Referring to FIGS. 1 and 7, the same elements are denoted by the same reference numerals.

A reproducing head 61 is a yoke type magnetoresistance effect element head. A first yoke 63 opposes a second yoke 64 with a gap layer 62 being interposed therebetween. The second yoke 64 is formed by a front yoke 64a and a back yoke 64b and a part of the second yoke 64 is substituted by a magnetoresistance effect element 65. The gap layer 62, the front yoke 64a of the second yoke, the magnetoresistance effect element 65, the back yoke 64b of the second yoke and the first yoke 63 configure a magnetic circuit. The magnetoresistance effect element 65 is the same as in the first embodiment, i.e., a spin valve type magnetoresistance effect element.

Figure 7A:
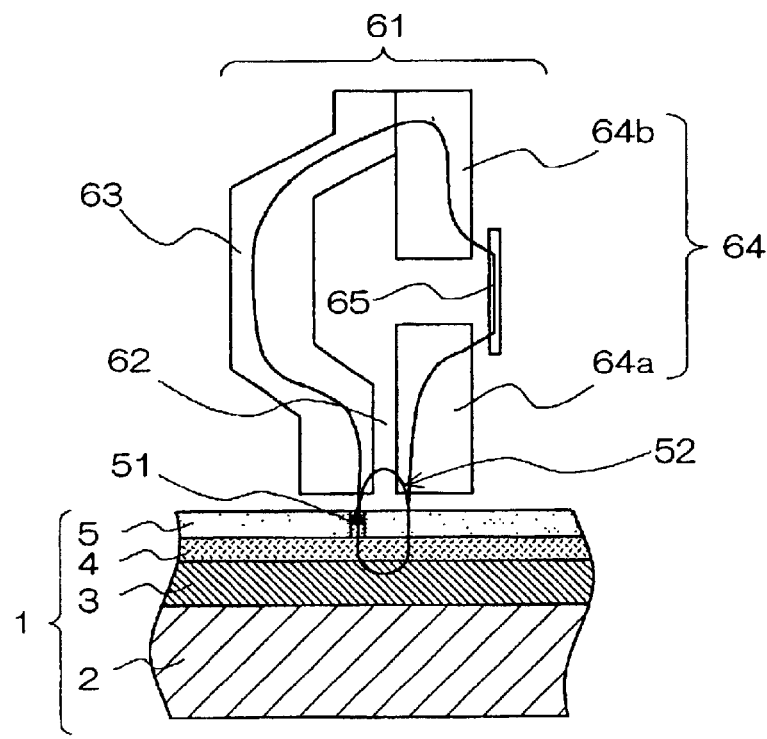
FIG. 7A is a cross-sectional view showing a schematic structure of (yoke type) reproducing head of magnetic recording and reproducing apparatus and a magnetic recording medium in accordance with a second embodiment of the present invention.
Figure 7B:
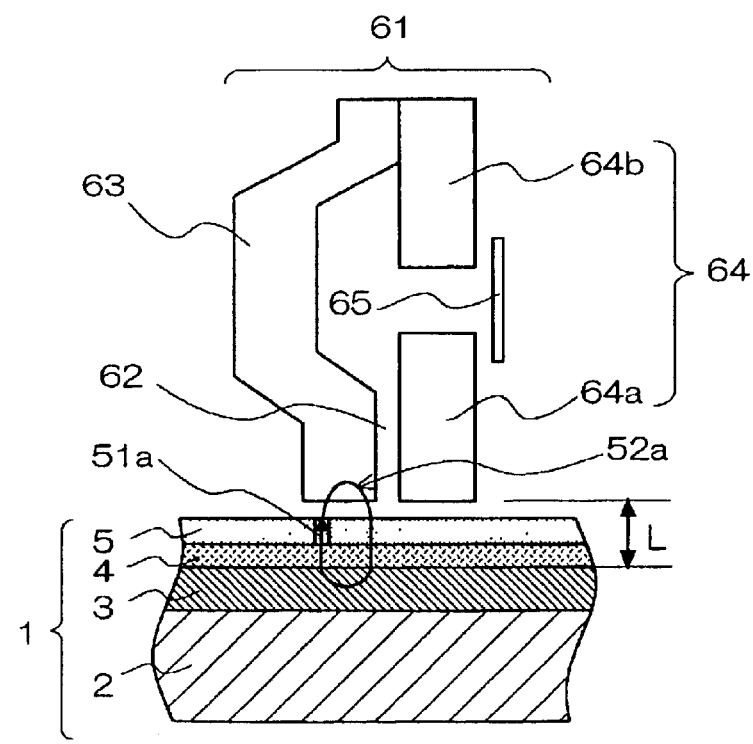
FIG. 7B is an explanatory view showing an operation of suppressing extension of the signal magnetic field loop of the recording magnetization by the non-magnetic layer, in accordance with the second embodiment of the present invention.
Figure 8A:
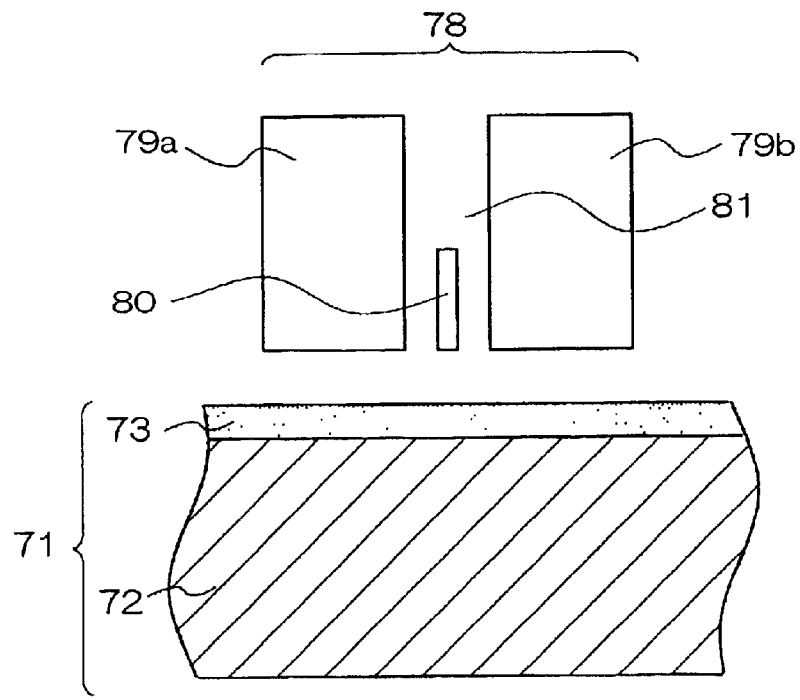
FIG. 8A is a cross-sectional view of conventional single layer medium and (shielded type) reproducing head.
Figure 8B:
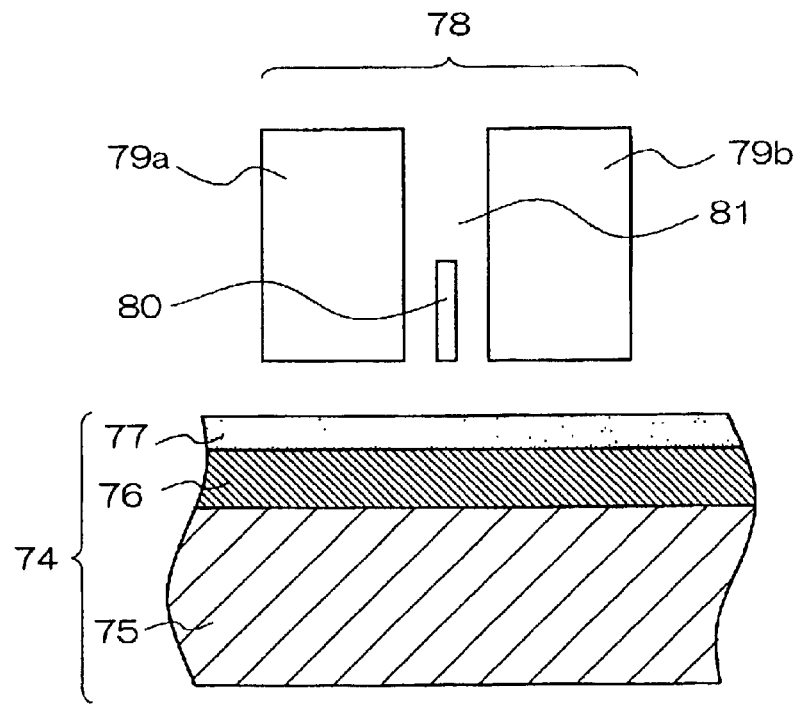
FIG. 8B is a cross-sectional view of conventional double-layer medium and the reproducing head.
Figure 9A:
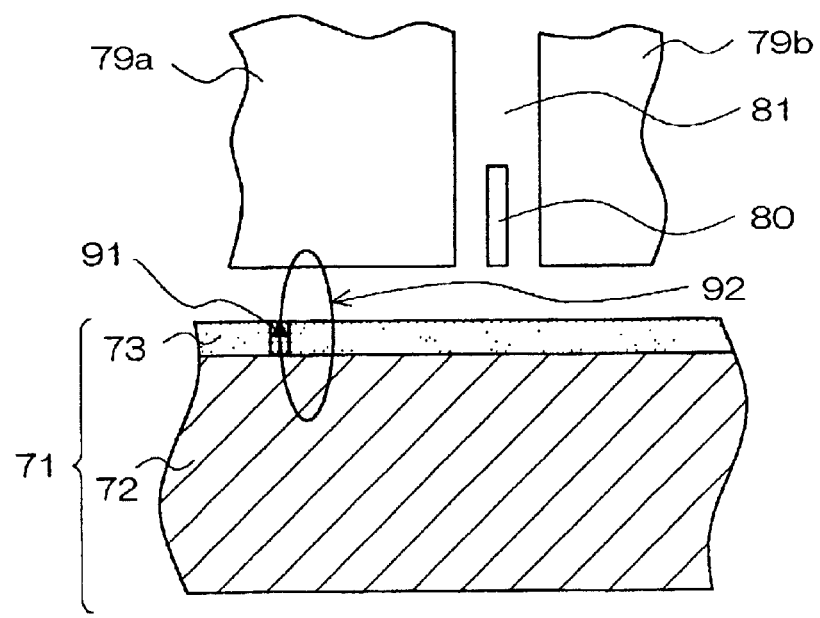
FIG. 9A is a schematic operational explanatory view showing reproduction in the conventional single layer medium by the shielded type reproducing head.
Figure 9B:
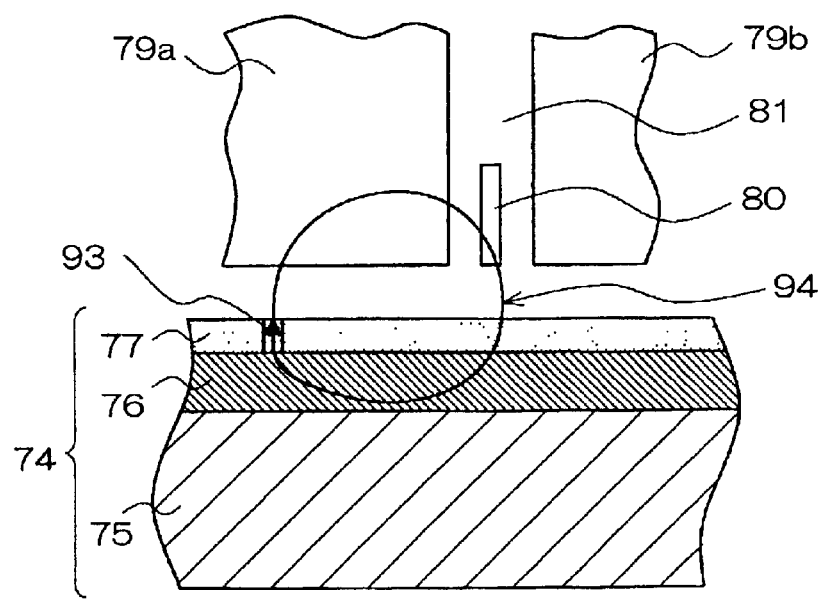
FIG. 9B is a schematic operational explanatory view showing reproduction in the conventional double-layer medium by the shielded type reproducing head.
Figure 10:
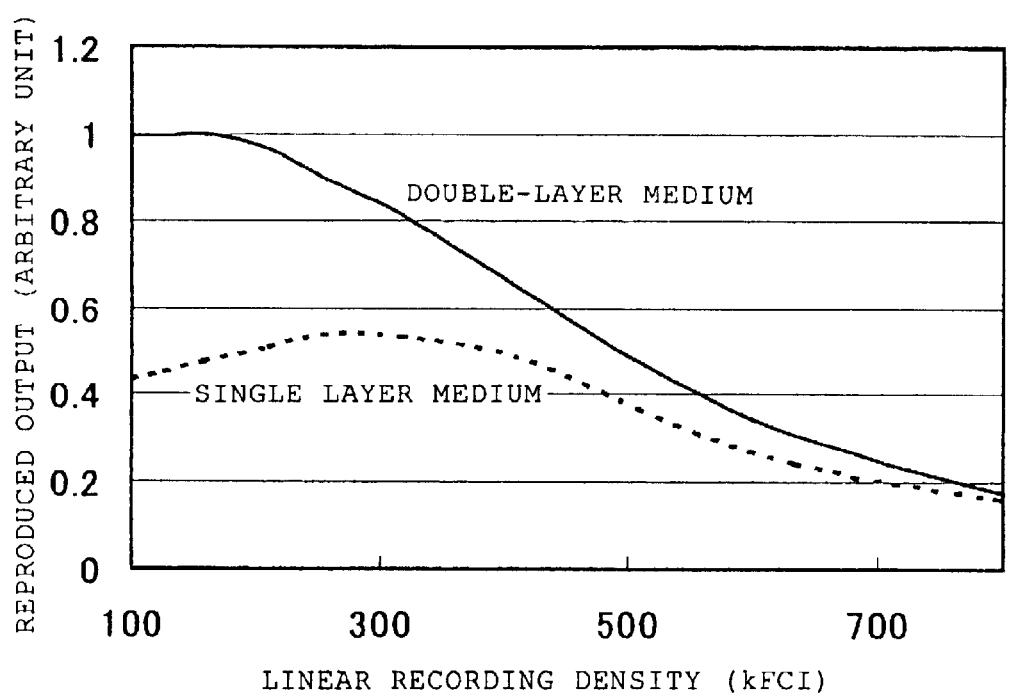
FIG. 10 is a characteristic view showing dependency of linear recording density at a time of conventional reproduction.

At a time of reproduction, as shown in FIG. 7A, a signal magnetic field loop 52 generated from a recording magnetization 51 in the perpendicular magnetic recording layer 5 immediately below the gap layer 62 is taken in the reproducing head 61 from the gap layer 62. The signal magnetic field loop 52 entered from the gap layer 62 passes through the magnetoresistance effect element 65 via the first yoke 63, the back yoke 64b. At this time, a variation in resistance is generated at the magnetoresistance effect element 65 and this variation of resistance is converted into an electric signal and the resultant signal is reproduced.

Next, a signal magnetic field loop 52a generated from the recording magnetization 51a on the perpendicular magnetic recording layer 5 placed at an area immediately below the gap layer 62 and in a vicinity of the same, i.e., an area that the first yoke 63 and the front yoke 64a of the second yoke oppose the perpendicular magnetic recording layer 5 will be considered.

Figure 11A:
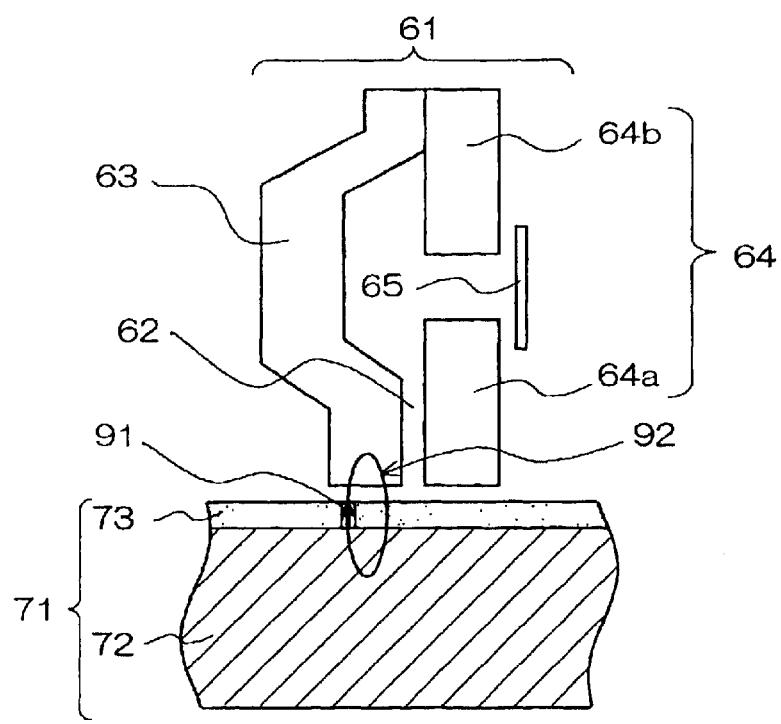
FIG. 11A is a schematic operational explanatory view showing reproduction in the conventional single layer medium by a yoke type reproducing head.
Figure 11B:
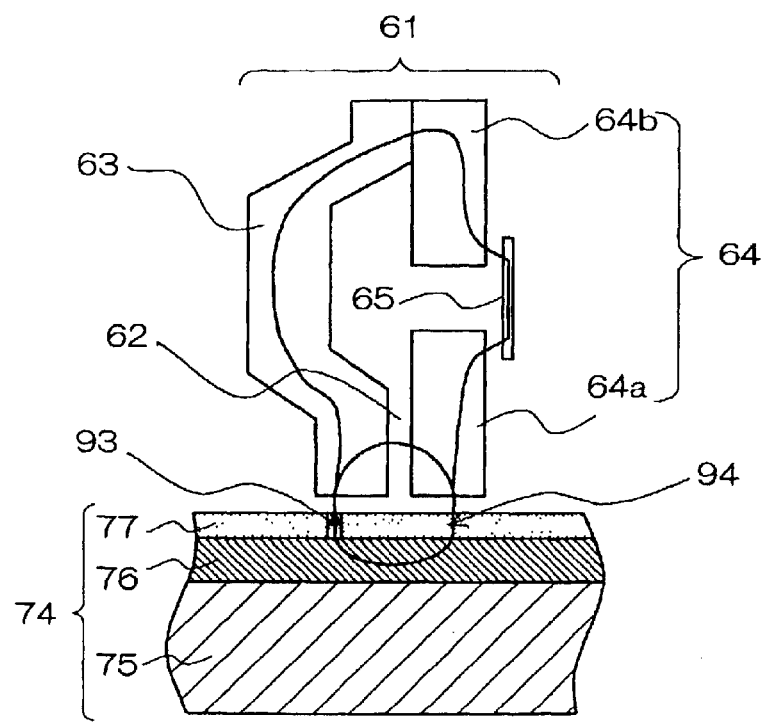
FIG. 11B is a schematic operational explanatory view showing reproduction in the conventional double-layer medium by the yoke type reproducing head.

The signal magnetic field loop 52a from the recording magnetization 51a flows extendedly as compared to the case of the single layer medium 71 shown in FIG. 11A because the soft magnetic layer 3 is formed. Same as in the first embodiment, as the non-magnetic layer 4 is interposed between the perpendicular magnetic recording layer 5 and the soft magnetic layer 3, a magnetic resistance between the perpendicular magnetic recording layer 5 and the soft magnetic layer 3 is increased. For this reason, extension of the signal magnetic field loop 52a is suppressed and thus the signal magnetic field loop is not extended as compared to the case of the double-layer medium 74 shown in FIG. 11B and does not reach the gap layer 62. As a result, the recording magnetization 51a is not reproduced and thus a resolution at a time of reproduction can be improved. Further, magnetic saturation of the magnetoresistance effect element 65 can be suppressed because of the same reasons.

Recording is the same as in the first embodiment. When a distance L between the reproducing head 61 and the soft magnetic layer 3 is about 100 nm, a recording magnetic field which is about five times larger than that of the single layer medium 71 shown in FIG. 11A can be obtained and thus excellent recording characteristic can be obtained.

In accordance with a yoke type magnetoresistance effect element head, a thickness of the gap layer 62 becomes a gap length. If the gap length is increased, same as in the first embodiment, the output halving recording density $D_{50}$ tends to be decreased. Nevertheless, as the non-magnetic layer 4 is interposed, even if the gap length is increased, the output halving recording density $D_{50}$ can be corrected to a value which is the same as in the case of smaller gap length.

Although the spin valve type magnetoresistance effect element is used as the magnetoresistance effect element in the above first and the second embodiments, instead of the spin valve type magnetoresistance effect element, a tunnel type magnetoresistance effect element can obtain the same effects. The tunnel type magnetoresistance effect element is formed by laminating an antiferromagnetic layer, a magnetization fixing layer, an insulating layer and a magnetization free layer.

Non-magnetic materials including $SiO_2$ and $Al_2O_3$ may be used as constitutive materials for the non-magnetic layer 4. Non-magnetic material (e.g., Ti or Co—Cr) may be mixed in order to improve orientation characteristic of the perpendicular magnetic recording layer 5. Alternatively, non-magnetic material (e.g., Ti or Co—Cr) may be laminated on the non-magnetic material such as $SiO_2$ or $Al_2O_3$ in order to improve the characteristics of the perpendicular magnetic recording layer 5.

As described above, in accordance with the present invention, a non-magnetic layer for increasing a magnetic resistance between a perpendicular magnetic recording layer and a soft magnetic layer and reducing a signal magnetic field loop of recording magnetization is interposed between the soft magnetic layer and the perpendicular magnetic recording layer. Thus, at a time of recording, recording characteristic is not deteriorated as compared to a case of conventional single layer medium. At a time of reproduction, a resolution of reproduction is better than that of conventional double-layer medium and saturation of magnetoresistance effect element can be suppressed.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A magnetic recording medium and a head for recording or reproducing information, said magnetic recording medium comprising:

a non-magnetic substrate;

a soft magnetic layer formed on and in contact with said substrate;

a non-magnetic layer formed on and in contact with said soft magnetic layer; and a recording layer consisting of a perpendicular magnetic layer formed on and in contact with said non-magnetic layer, a gap length associated with said head for recording or reproducing information that is 90 nm or less and 50 nm or more, wherein said non-magnetic layer has a thickness exceeding 20 nm so as to reduce a signal magnetic field loop of recording magnetization of said perpendicular magnetic recording layer, and wherein said soft magnetic layer consists of soft magnetic material.

2. The magnetic recording and reproducing apparatus according to claim 1, wherein a reproducing head for reproducing said magnetic recording medium is configured as a shielded reproducing head having a magnetoresistance effect element which is sandwiched between shielding layers with a non-magnetic layer being interposed therebetween.

3. The magnetic recording and reproducing apparatus according to claim 2, wherein said magnetoresistance effect element is a giant magnetoresistance effect element which is formed by laminating, at least, a magnetization fixing layer, a conductor layer and a magnetization free layer.

4. The magnetic recording and reproducing apparatus according to claim 2, wherein said magnetoresistance effect element is a tunnel magnetoresistance effect element which is formed by laminating, at least, a magnetization fixing layer, an insulating layer and a magnetization free layer.

5. The magnetic recording and reproducing apparatus according to claim 1, wherein a reproducing head for reproducing said magnetic recording medium is configured as a yoke reproducing head in which a magnetoresistance effect element is disposed at a part of magnetic circuit including a gap layer.

6. The magnetic recording and reproducing apparatus according to claim 5, wherein said magnetoresistance effect element is a giant magnetoresistance effect element which is formed by laminating, at least, a magnetization fixing layer, a conductor layer and a magnetization free layer.

7. The magnetic recording and reproducing apparatus according to claim 5, wherein said magnetoresistance effect element is a tunnel magnetoresistance effect element which is formed by laminating, at least, a magnetization fixing layer, an insulating layer and a magnetization free layer.

8. A magnetic recording and reproducing apparatus comprising a magnetic recording medium for perpendicular magnetic recording and a head for recording or reproducing information with respect to said magnetic recording medium, said magnetic recording medium comprising:

a non-magnetic substrate;

a soft magnetic layer formed on and in contact with said substrate;

a non-magnetic layer formed on and in contact with said soft magnetic layer; and a recording layer consisting of a perpendicular magnetic layer formed on and in contact with said non-magnetic layer, a gap length associated with said head for recording or reproducing information that is 90 nm or less and 50 nm or more, wherein said non-magnetic layer has a thickness exceeding 20 nm so as to reduce a signal magnetic field loop of recording magnetization of said perpendicular magnetic recording layer, and wherein said soft magnetic layer consists of soft magnetic material.

9. The magnetic recording and reproducing apparatus according to claim 8, wherein a reproducing head for reproducing said magnetic recording medium is configured as a shielded reproducing head having a magnetoresistance effect element which is sandwiched between shielding layers with a non-magnetic layer being interposed therebetween.

10. The magnetic recording and reproducing apparatus according to claim 8, wherein a reproducing head for reproducing said magnetic recording medium is configured as a yoke reproducing head in which a magnetoresistance effect element is disposed at a part of magnetic circuit including a gap layer.

11. A magnetic recording apparatus having a magnetic recording medium and a head, said magnetic recording medium comprising:

a substrate consisting of non-magnetic materials;

a soft magnetic layer formed on and in contact with said substrate;

a non-magnetic layer formed on and in contact with said soft magnetic layer; and a recording layer consisting of a perpendicular magnetic layer formed on and in contact with said non-magnetic layer, a gap length associated with said head for recording or reproducing information that is 90 nm or less and 50 nm or more.

wherein said non-magnetic layer has a thickness exceeding 20 nm so as to reduce a signal magnetic field loop of recording magnetization of said perpendicular magnetic recording layer, and wherein said soft magnetic layer consists of soft magnetic material.

12. A magnetic recording and reproducing apparatus comprising a magnetic recording medium for perpendicular magnetic recording and a head for recording or reproducing information with respect to said magnetic recording medium, said magnetic recording medium comprising:

a substrate consisting of non-magnetic materials;

a soft magnetic layer formed on and in contact with said substrate;

a non-magnetic layer formed on and in contact with said soft magnetic layer; and a recording layer consisting of a perpendicular magnetic layer formed on and in contact with said non-magnetic layer, a gap length associated with said head for recording or reproducing information that is 90 nm or less and 50 nm or more, wherein said non-magnetic layer has a thickness exceeding 20 nm so as to reduce a signal magnetic field loop of recording magnetization of said perpendicular magnetic recording layer, and wherein said soft magnetic layer consists of soft magnetic material.

* * * * *